United States Patent [19]
Yokoyama et al.

[11] Patent Number: 5,420,708
[45] Date of Patent: May 30, 1995

[54] COLOR FILTERS, INCLUDING TAKING OUT ELECTRODES OR POST-ITO LAYER

[75] Inventors: Seiichirou Yokoyama; Hideaki Kurata, both of Sodegaura, Japan

[73] Assignee: Idemitsu Kosan Co., Ltd., Tokyo, Japan

[21] Appl. No.: 849,394

[22] PCT Filed: Aug. 30, 1991

[86] PCT No.: PCT/JP91/01159

§ 371 Date: Apr. 27, 1992

§ 102(e) Date: Apr. 27, 1992

[87] PCT Pub. No.: WO92/04654

PCT Pub. Date: Mar. 19, 1992

[30] Foreign Application Priority Data

Aug. 31, 1990 [JP] Japan ................. 2-230380
Mar. 29, 1991 [JP] Japan ................. 3-091054

[51] Int. Cl.⁶ .................. G02F 1/1335; G02F 1/1343
[52] U.S. Cl. ........................ 359/67; 359/68; 359/88
[58] Field of Search ......................... 359/88, 67, 68

[56] References Cited

U.S. PATENT DOCUMENTS

| | | | |
|---|---|---|---|
| 4,560,241 | 12/1985 | Stolov et al. | 359/68 |
| 4,639,088 | 1/1987 | Suginoya et al. | 359/68 |
| 4,779,957 | 10/1988 | Suginoya et al. | 359/68 |
| 4,935,757 | 6/1990 | Hatano et al. | 359/88 |
| 5,045,418 | 9/1991 | Fukuyoshi | 359/68 |
| 5,206,750 | 4/1993 | Aizawa et al. | 359/68 |

FOREIGN PATENT DOCUMENTS

| | | |
|---|---|---|
| 032829 | 8/1989 | European Pat. Off. . |
| 0338412 | 10/1989 | European Pat. Off. . |
| 0355585 | 2/1990 | European Pat. Off. . |
| 61-116333 | 6/1986 | Japan ............. 359/68 |
| 62-38422 | 2/1987 | Japan ............. 359/68 |
| 62-242918 | 10/1987 | Japan ............. 359/68 |
| 1295224 | 11/1989 | Japan ............. 359/68 |
| 2-55323 | 2/1990 | Japan ............. 359/68 |
| 3-39718 | 2/1991 | Japan ............. 359/68 |

Primary Examiner—William L. Sikes
Assistant Examiner—Ron Trice
Attorney, Agent, or Firm—Kanesaka & Takeuchi

[57] ABSTRACT

A black matrix 2 and a taking out electrode 3 are formed on a glass substrate 1, using a light-shielding conductive film made of a metal or the like. On this film, an insulating film 4 is formed. At the same time, a taking out electrode window 5 is formed on the portion of the insulating film 4 corresponding to the taking out electrode 3. Then, an electrode for forming a coloring matter layer (ITO electrode) 6 is formed on the insulating film 4. Then, the taking out electrode window 5 is filled with an ITO electrode material, to electrically connect the taking out electrode 3 and the ITO electrode 6. Then the outer electrode was connected to the taking out electrode 3. The electricity was turned on the outer electrode to form a coloring matter layer 8 on the ITO electrode 6.

15 Claims, 15 Drawing Sheets

Fig. 16 *Prior Art*

COLOR FILTERS, INCLUDING TAKING OUT ELECTRODES OR POST-ITO LAYER

TECHNICAL FILED

The present invention relates to a color filter and a process for producing a color filter. The present invention further relates to a color liquid crystal panel comprising the color filter and a method of driving the color liquid crystal panel.

BACKGROUND ART

Color filters prepared by laminating a coloring matter layer on an insulating substrate are used in a color liquid crystal panel for a display of a liquid crystal TV, a personal computer or the like. Heretofore, a color filter having a structure as indicated in FIG. 16, has been known. In the color filter as indicated in FIG. 16, a transparent ITO (Id-Sn oxide) electrode (b) is formed on an insulating glass substrate (a). On the ITO electrode, coloring matter layers (c) for primary three colors, i.e., R (red), G (green) and B (blue), are formed, and a black matrix (light-shielding film) (d) is formed between each of the coloring matter layers (C). Such black matrix is used to avoid lowering of contrast and color purity due to leaked light. In addition, in FIG. 16, (e) denotes a top coating layer and (f) denotes a post-ITO layer.

In general, the coloring matter layers of the color filters are formed by known methods. Such known methods include: a printing method which comprises printing inks for three primary colors (RGB) on a glass substrate with use of a printing equipment; a dispersion method which comprises applying a pigment dispersed in a UV-curable resist on a glass substrate, and then forming coloring matter layers for red, green and blue by repeating mask exposure and thermal curing, three times, by way of a photo-lithography method; a dyeing method which comprises forming a resist layer as a dye preventing layer on a gelatin layer, and dyeing the gelatin layer to form coloring matter layers for RGB; an electro-deposition method which comprises forming a dispersion of a pigment and an electrodepositing polymer, and subjecting the dispersion to electro-deposition treatment utilizing an electrode formed on the substrate; and a micellar disruption method which comprises forming a dispersion of a pigment and a surfactant, and subjecting the dispersion to electrolytic treatment utilizing an electrode formed on the substrate.

The coloring matter layers of the color filter as shown in FIG. 16 are usually formed by way of an electrical treatment such as an electro-deposition method or a micellar disruption method (Refer to Japanese Patent Application Unexamined Publication No. 63-243298).

Carbon type photo-resist materials are widely used in the other color filter production methods such as a printing method, dispersion method and dyeing method. However, if such carbon type photo-resist materials are used in the electrical treatment such as a micellar disruption method or an electro-deposition method, there will be several problems due to their conductivity. More specifically, if such a conductive resist material is used, when a black matrix is first formed and then coloring matter layers are formed, or when electrodes for forming coloring matter layers are used to drive liquid crystals, the vicinal transparent electrodes will be electrically connected through the black matrix. Thus, the operations cannot be properly conducted.

Accordingly, in a micellar disruption method or an electro-deposition method, as an insulating resist material used for forming a black matrix, the insulating material preferably having a surface resistance of not less than $10^7 \, \Omega/cm^2$ is used.

As insulating resist material used for forming a black matrix, organic pigment type materials are known.

However, when a black matrix is prepared from an organic pigment type insulating resist material, there is a problem that the light-shielding rate is decreased. This is because a black matrix is formed by way of a photo-lithography method using a blend of three kinds of a resist material each containing a pigment for red, green or blue.

It is said that as for the light-shielding rate, for example, in the case of a TFT panel, optical density (OD) should be as high as 3.5 or more. However, in the case of an organic pigment type resist material, it is difficult to prepare a black matrix having an OD of at least 2.5.

It is desired that a metal black matrix is used as a black matrix having high light-shielding rate. However, in the case of using the metal black matrix in a micellar disruption method or an electro-deposition method, there will be the problem as is the same case with the above-mentioned carbon type resist due to conductivity of the metal black matrix. In other words, the micellar disruption method and the electro-deposition method cannot be used to form a coloring matter film. Also, a transparent electrode for forming a coloring matter film cannot be used to drive a liquid crystal.

Accordingly the first invention has its object to provide a color filter and its production process which solve the above-mentioned problems, i.e., having a structure wherein the vicinal transparent electrodes are not electrically connected even when a metal black matrix is used.

Further, the first invention has another object to provide a color liquid crystal panel and its driving method.

In the meanwhile, a printing method, a dispersion method and a dyeing method can form a coloring matter layer in a desired place on a glass substrate (e.g., effective display portion) because of their nature in the production process. However, when a color filter is formed by a micellar disruption method, an electro-deposition method or the like using electricity passing treatment as used in the first invention, the following procedure is needed. As shown in FIG. 17, it is necessary to form an electrode 6a for electricity passing treatment by taking out an electrode in a portion other than an effective display area S (non-effective display area) in order to connect a coloring matter layer forming transparent electrode 6 in the effective display area S to an outer electrode.

Further, as shown in FIGS. 17 and 18, it is required that the electricity passing treatment should be conducted for an electrode for the same color, at the same time, among stripe-shaped transparent electrodes for forming coloring matter layers arranged in the order of red, green and blue. To do this, the electrodes 6a for the electricity passing treatment for RGB should be formed such that each electrode 6a for each color should have different length; an insulating film is formed on an electrode taking out window frame 13; an electrode taking out window 14 is formed in the insulating film; then a silver paste 15 is applied along with the window for each color in the stripe-shape. Thus, the contact of the electrodes for each color is made.

Further, the present applicant provided in an earlier patent application (Japanese Patent Application No. 241084/89), a technique to simplify these steps. In such technique, when a black matrix is formed by using a light-shielding resist, an electrode taking out window is formed by using said resist.

However, in the above-mentioned conventional production process for producing a color filter, there is a problem that a step of applying a silver paste along with the electrode taking out window in the stripe-shape is required.

Further, when a liquid crystal display is assembled (cell assembling) by using a color filter, a step of removing the silver paste or a step of cutting or scrubbing the silver paste portion using a dicer or scrubber, is required.

Furthermore, there is a problem that additional equipments are required to remove dusts made at the time of removing the silver paste by vacuum treatment or the like.

Accordingly, the second invention has its object to provide a color filter, its production process, a color liquid crystal panel and its driving method, which can omit silver paste applying/removing steps, resulting in improvement of productivity.

DISCLOSURE OF THE INVENTION

The color filter according to the first embodiment of the present invention is prepared by laminating a metal black matrix, an insulating film, a transparent electrode and a coloring matter layer, in this order, on one side of an insulating substrate.

In the color filter of the first embodiment, the vicinal transparent electrodes are not electrically connected since there is an insulating layer between the metal black matrix and the transparent electrodes. Further, use of the metal black matrix results in high light-shielding rate (usually OD is at least 3.5) and good contrast. Thus, the color filter can be suitably used as a color filter for an active matrix such as TFT or MIM. Further, since the coloring matter layers and the metal black matrix are electrically disconnected by the insulating layer, the electrodes for forming a coloring matter layer can be used as electrodes for driving a liquid crystal.

Further, a process for producing a color filter according to the fist embodiment of the present invention comprises the following steps (1) to (6):

(1) a step of laminating a metal thin film used for forming a black matrix on one side of an insulating substrate;

(2) a step of subjecting the above metal thin film to patterning treatment to form a black matrix;

(3) a step of laminating an insulating film by covering the above metal black matrix;

(4) a step of laminating a transparent electrode forming material on the above insulating film;

(5) a step of subjecting the above transparent electrode forming material to patterning treatment to form a transparent electrode; and (6) a step of laminating a coloring matter layer on the above transparent electrode by way of a coloring matter film forming method using an electricity passing treatment.

According to the process of the first invention, a coloring matter layer can be formed by a method using electricity passing treatment such as a micellar disruption method or an electro-deposition method since the transparent electrodes are not connected to each other. Thus, in addition to the effect of the metal black matrix, a stable color filter having a high light-shielding property, good surface flatness and high color purity, and not showing delamination and non-uniform color, can be produced. Further, according to the process of the first invention, soda lime glass which has not been subjected to polishing, silica coating or the like can be used as an insulating substrate.

Further, a method of driving the color liquid crystal panel according to the first invention comprises driving the color liquid crystal panel with use of transparent electrodes for forming a coloring matter layer.

Further, the color filter according to the second invention is prepared by laminating, in this order, a black matrix and a taking out electrode, an insulating film having a window for a taking out electrode, a transparent electrode for forming a coloring matter layer, an insulating protection layer, a coloring matter layer, a flattening film and an electrode for driving a liquid crystal on an insulating substrate, characterized in that said taking out electrode and the transparent electrode for forming a coloring matter layer are electrically connected through said window for a taking out electrode.

Furthermore, a process for producing a color filter according to the second invention comprises: forming and laminating, in this order, a black matrix, a taking out electrode and an insulating film having a window for a taking out electrode; forming a transparent electrode for forming a coloring matter layer on the insulating layer in such manner that the transparent electrode can be electrically connected to the taking out electrode through the widow for a taking out electrode; and then forming a coloring matter layer by passing electricity to the transparent electrode for forming a coloring matter layer through the taking out electrode. Preferably, the exposure and development time for the photo-lithography treatment is controlled to form the periphery portion of the taking out electrode window of the insulating film in the taper shape.

Further, a color liquid crystal display according to the second invention is composed of the above-mentioned color liquid crystal panel, an electrode substrate for driving a liquid crystal and a liquid crystal encapsulated between them.

According to the color filter and the color liquid crystal display of the second invention, the silver paste applying and removing steps can be omitted. Thus, the process can be simplified.

In addition, according to the production process of a color filter of the second invention, the color filter according to the second invention can be effectively produced.

MOST PREFERRED EMBODIMENTS CARRYING OUT THE INVENTION

The first invention will be described in more detail with reference to the attached drawings.

Figure 1:
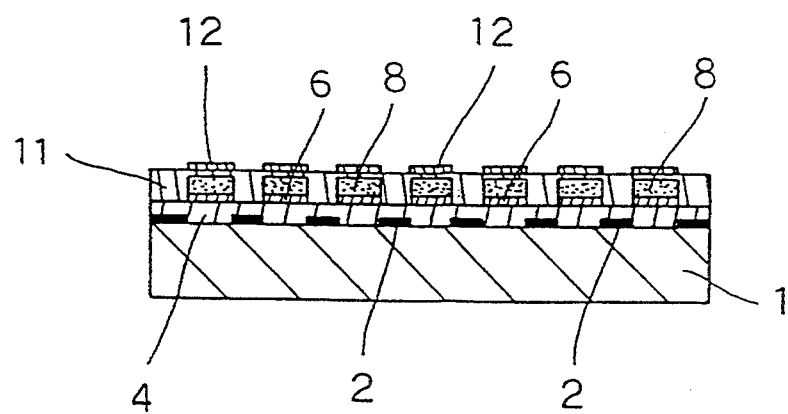
FIG. 1 is a cross-sectional view of one example of the color filter according to the first invention.

FIG. 1 shows one example of a color filter according to the first invention. The color filter is made useful for driving MIM or STN.

In the color filter, 1 denotes an insulating substrate. A metal black matrix 2 which has been subjected to patterning is formed on one side of the substrate 1, and an insulating film 4 is laminated to cover the black matrix. Further, transparent electrodes 6 which have been subjected to patterning, are formed on the insulating layer 4. Coloring matter layers 8 for RGB primary colors are formed on the transparent electrodes 6. Further, a top coating layer 11 is laminated on the coloring matter layers 8. A post-ITO layer 12 which has been subjected to patterning, is formed on the top coating layer 11.

Figure 2:
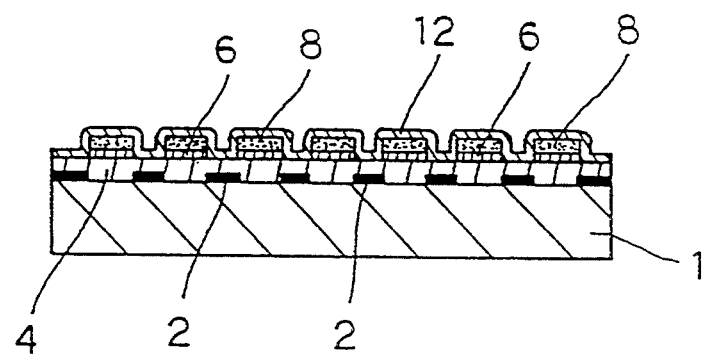
FIG. 2 is a cross-sectional view of another example of the color filter according to the first invention.

FIG. 2 shows another example of the color filter according to the first invention. The color filter is made useful for driving TFT. In the color filter, an insulating substrate 1, a metal black matrix 2, an insulating film 4, transparent electrodes 6 and coloring matter layers 8 are the same as those in FIG. 1. In this example, a top coating layer is not formed, and a post-ITO layer 12 which has not been subjected to patterning is laminated on the coloring matter layers 8. Of course, a top coating layer can be formed.

In addition, the above-mentioned color filter is used for driving MIM, STN or TFT. However, it is possible that the structure can be modified in several ways depending upon the intended use or the like within the spirit of the present invention.

Next, the process for producing a color filter of the first invention will be explained in the order of the steps (1) to (6).

(1) A thin metal film used for forming a black matrix is laminated on one side of an insulating substrate.

In this case, as an insulating substrate, a glass substrates such as soda lime glass, non-alkali glass can be preferably used. In addition, as soda lime glass, non-polished products as well as polished products can be used. More specifically, recently a soda lime glass substrate is usually subjected to polishing treatment (mirror polishing) if used as a liquid crystal panel, because the scratches on the soda lime glass surface cause braking of electrode lines at the time of ITO patterning. Also, soda lime glass is usually subjected to a silica coating treatment because the alkali elution causes shortening of the life of the liquid crystal. On the contrary to this, in the present invention, the treatment to the soda lime glass (polishing, silica dipping) is not required because the black matrix and the insulating film can avoid the alkali elution, and flatten the surface.

Further, metals for the black matrix are not particularly limited, but chromium or nickel is preferably used.

As a method of forming a thin metal film, sputtering, vapor deposition, CVD or the like can be mentioned.

(2) The above-mentioned thin metal film is subjected to patterning to form a black matrix.

In this case, patterning methods are not limited to, but include, for example, a method comprising conducting resist application by a roll coater or a spin coater; exposure treatment with a stepper exposing equipment or a one-shot exposing equipment; development; etching; and resist removal in this order.

(3) An insulating film is laminated to cover the above-mentioned thin metal black matrix.

In this case, the materials for the insulating film are not limited to, but preferably include, for example, silica, titania, alumina and an insulating polymer.

Examples of methods of forming the insulating film are, for example, a method of sputtering silica, titania or alumina, a method of dipping in silica and a method of coating an insulating polymer.

(4) A transparent electrode forming material is laminated on the above-mentioned insulating film. In this case, examples of the transparent electrode forming materials are ITO and tin oxide. Examples of a method of laminating the transparent electrode forming material are a sputtering method, a vapor deposition method and a pyro-sol method.

(5) A transparent electrode is formed by subjecting the above-mentioned transparent electrode forming material to patterning.

In this case, examples of a method of patterning can be the same as those previously described for the above-mentioned step (2).

(6) A coloring matter layer is laminated on the above-mentioned transparent electrode.

In this case, as a method of forming a coloring matter layer, a method using electricity passing treatment, particularly a micellar disruption method or an electro-deposition method, can be preferably used.

To form the above coloring matter thin film by a micellar disruption method, the following procedures can be used. A micelle forming agent comprising ferrocene derivatives and a coloring matter material (hydrophobic coloring matter) are added to an aqueous solvent having a controlled conductance prepared by adding, as necessary, a support electrolyte to water. The mixture is well stirred to obtain a micelle containing the coloring matter material therein. When the micelle solution is subjected to electrolytic treatment, the micelle moves to an anode. The ferrocene derivative contained in the micelle loses an electron, $e^-$ ($Fe^{2+}$ of the ferrocene is oxidized to $Fe^{3+}$) on the anode (transparent electrode), and at the same time the micelle is broken. When the micelle is broken, a coloring matter material is precipitated on the anode to form a thin film.

On the other hand, the oxidized ferrocene derivative moves to a cathode and receives an electron, $e^-$ to reform a micelle. While the micelle formation and breakage are repeated, coloring matter particles are precipitated on the transparent electrode to form a thin film. The desired coloring matter thin film is formed in this manner. The thus obtained coloring matter thin film has, in general, a thickness of 0.1 to 10.0 μm, preferably 0.1 to 2.0 μm. Due to the porous structure of the thin film, the thin film has high conductance.

If the film thickness is less than 0.1 μm, the hue of the coloring matter layer cannot sufficiently be exhibited. If the thickness is more than 10.0 μm, the film will have low conductance. Thus, the thin film having the above thickness range is preferable.

In the case of forming coloring matter films for three primary colors by the above-mentioned micellar disruption method, any one of red, green and blue hydrophobic coloring matters is first added to an aqueous medium, and the first desired color thin film is formed by the above-mentioned micellar disruption method. Then, the micelle electrolytic treatment is repeatedly carried out by using different hydrophobic coloring matter to form coloring matter films for the three primary colors (red, green, blue) on each transparent electrode. In addition, it is possible to get hydrophobic coloring matters for red, green and blue dispersed in an aqueous medium at the same time, and subject the aqueous medium to the micelle electrolytic treatment to produce the similar coloring matter films.

In the production process according to the present invention, in addition to the above-mentioned steps, the following steps (7) to (9) can be conducted.

(7) An electrode taking out zone can be formed in the color filter by using an insulating resist material and an electrically conductive material before or after the formation of the coloring matter films. According to this step, a color filter capable of using transparent electrodes for forming a coloring matter layer as electrodes for driving crystal liquids, can be readily produced.

Figure 3:
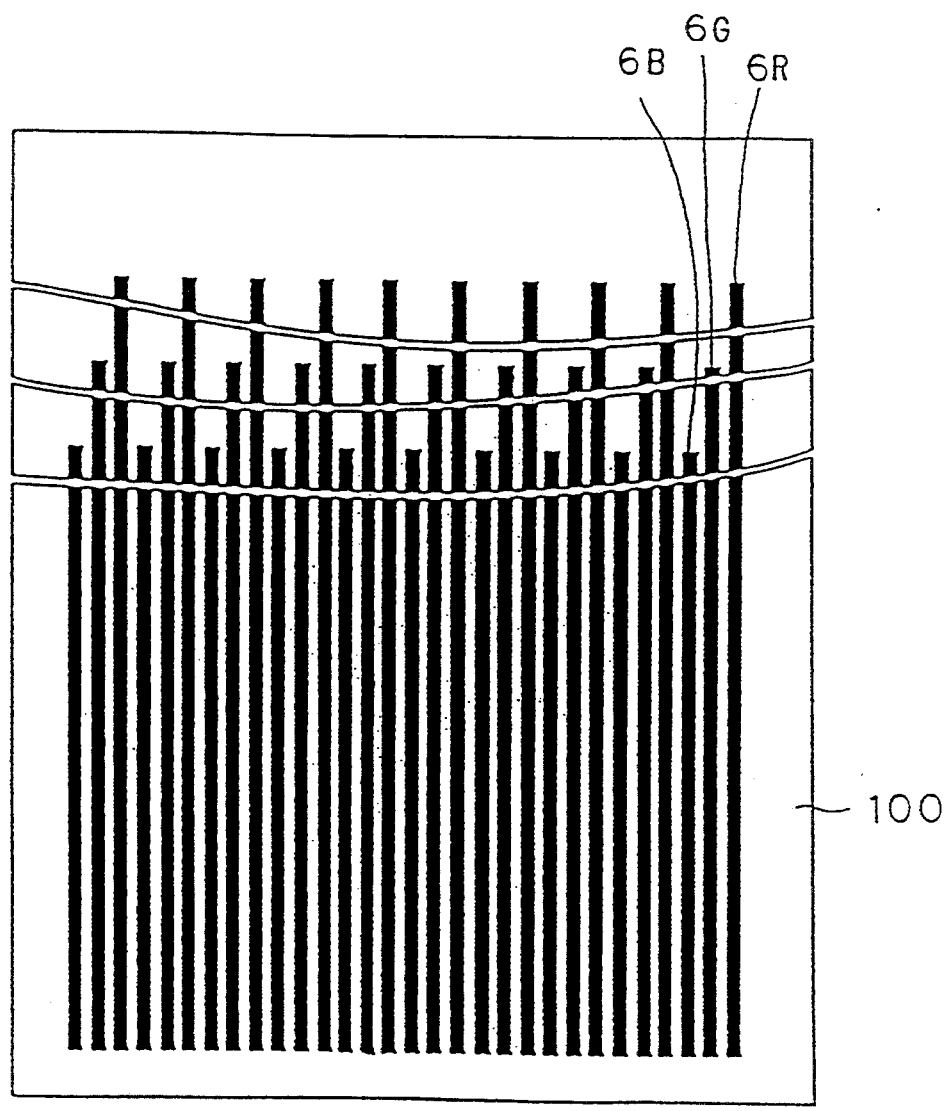
FIG. 3 is a plan view showing a mask for forming a transparent electrode.

For example, if patterning of a transparent electrode is conducted by using a mask 100 as shown in FIG. 3 in the above-mentioned step (5), 10 sets of three electrode lines (i.e., the shortest line 6B, the middle length line 6G and the longest line 6R) can be formed. The three lines 6B, 6G and 6R correspond to three primary colors for light, i.e., blue (B), green (G) and red (R), respectively.

Figure 4:
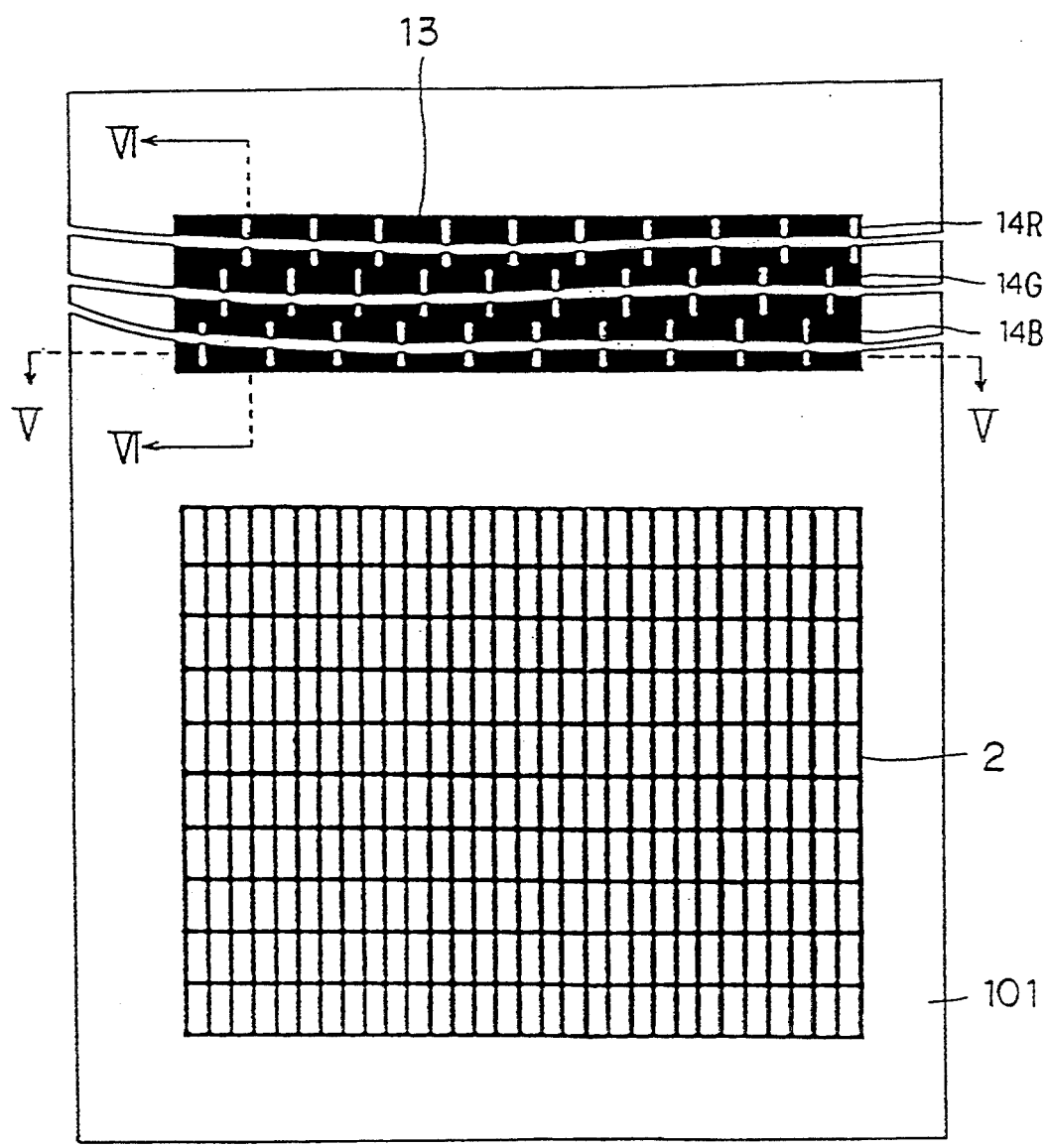
FIG. 4 is a plan view showing a mask for forming a black matrix and an electrode taking out zone.

An insulating layer for taking out an electrode is formed with an insulating resist material and a mask 101 as shown in FIG. 4. The mask 101 has not only a black matrix pattern 2, but also an electrode taking out zone pattern 13. The pattern 13 comprises patterns for forming three sets of electrode taking out window belts. In other words, the pattern 13 comprises a pattern 14B for forming an electrode taking out window belt for electrode lines (B), a pattern 14G for forming an electrode taking out window belt for electrode lines (G) and a pattern 14R for forming an electrode taking out window belt for electrode lines (R). Further, electrically conductive layers for taking out electrodes are formed by using an electrically conductive material.

Figure 5:
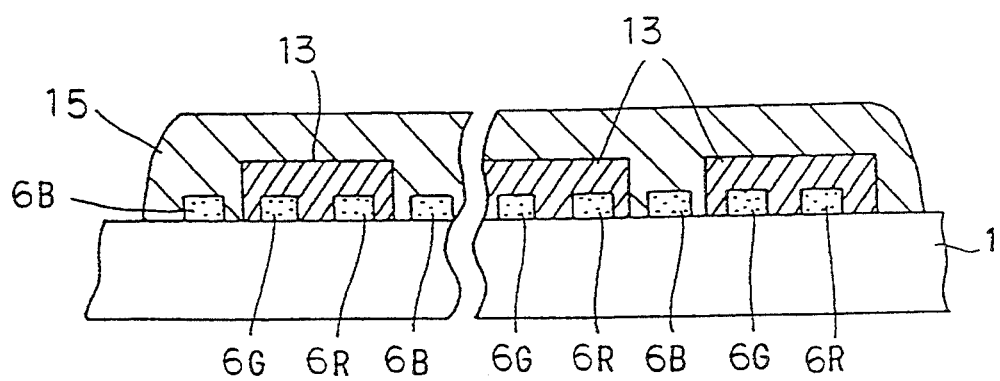
FIGS. 5 and 6 are cross-sectional views of an electrode taking out zone.
Figure 6:
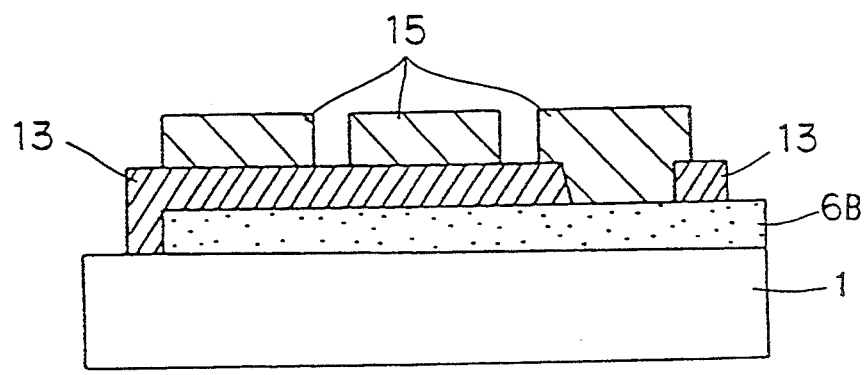

FIGS. 5 and 6 show an electrode taking out zone of a color filter produced by using a mask 100 and a mask 101. FIG. 5 is a cross-sectional view of a color filter, taken along the V—V line of a mask 101. FIG. 6 is a cross-sectional view of a color filter, taken along the VI—VI line of a mask 101. As shown in FIGS. 5 and 6, the electrode lines 6G and 6R are coated with an insulating layer 13. The electrode lines 6B are electrically connected to each other through an electrically conductive layer 15.

In addition, the insulating resist materials for forming the insulating layer usually include a negative type UV sensitive resist. The electrically conductive materials for forming the electrically conductive layers include, for example, an electrically conductive thin film and electrically conductive paste.

(8) If necessary, like the color filter as shown in FIG. 1, a top coating material may be coated with a spin coater or a roll coater on the coloring matter layer and dried at 80° to 150° C. for 5 to 60 minutes to form a top coating layer. The top coating material include, for example, an acrylic resin, polyether resin, polyester resin, polyolefin resin, phosphazene resin, or polyphenylene sulfide resin. If the coating layer is prepared from a conductive material, voltage down due to the coating layer can be prevented, and the electrodes for forming a coloring matter layer can be effectively used as electrodes for driving a liquid crystal.

(9) If necessary, like the color filter as shown in FIGS. 1 and 2, a post-ITO layer is formed on a top coating layer (FIG. 1) or a coloring matter layer (FIG. 2). The post-ITO layer functions as an electrode for driving a liquid crystal separately from the electrode for forming a coloring matter layer. In addition, in the case of producing a color filter for driving MIM or STN, a post-ITO is subjected to patterning (FIG. 1).

The color liquid crystal panel according to the present invention is produced using the above-mentioned color filter. In this case, a means for producing a panel is not limited. However, the following method can be preferably used.

First, an orientation layer is formed by coating, for example, a polyamic acid monomer, a polyimide resin oligomer or the like by a spin coater or a roll coater on a color filter, polymerizing the coated material at 200° to 300° C. for 30 minutes to 2 hours, washing with pure water or the like, and drying the polymerized product (at 60° to 100° C. for 30 minutes to 2 hours or by IR radiation or the like). The liquid crystals can be oriented by the orientation layer. Then, a color filter is fixed to a driving electrode substrate such as TFT, MIM (active matrix) and DUTY (simple matrix) using a spacer made of glass beads or plastics and an encapsulating agent such as adhesive, and then subjected to rubbing treatment such as abrasion rubbing or oblique evaporation. Simultaneously, a liquid crystal such as TN, STN, FLC, AFLC or VAN is pored, by vacuum poring or the like, between the driving electrode substrate and the color filter.

According to the method of driving a color liquid crystal panel of the present invention, a color liquid crystal panel is driven by a transparent electrode used to form a coloring matter layer. In this case, as a driving circuit, desired ones such as MIM and TFT can be used depending upon the kind of the color filter used. Further, in this case, a post-ITO is not formed.

Next, the second invention will be described in more detail with reference to the attached drawings.

Figure 7:
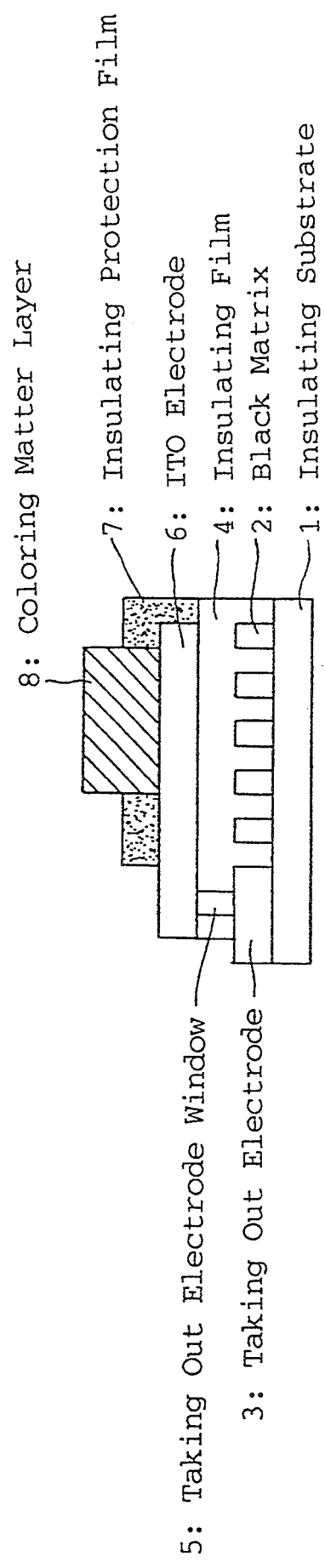
FIG. 7 shows a structure of the color filter according to the second invention.
Figure 8:
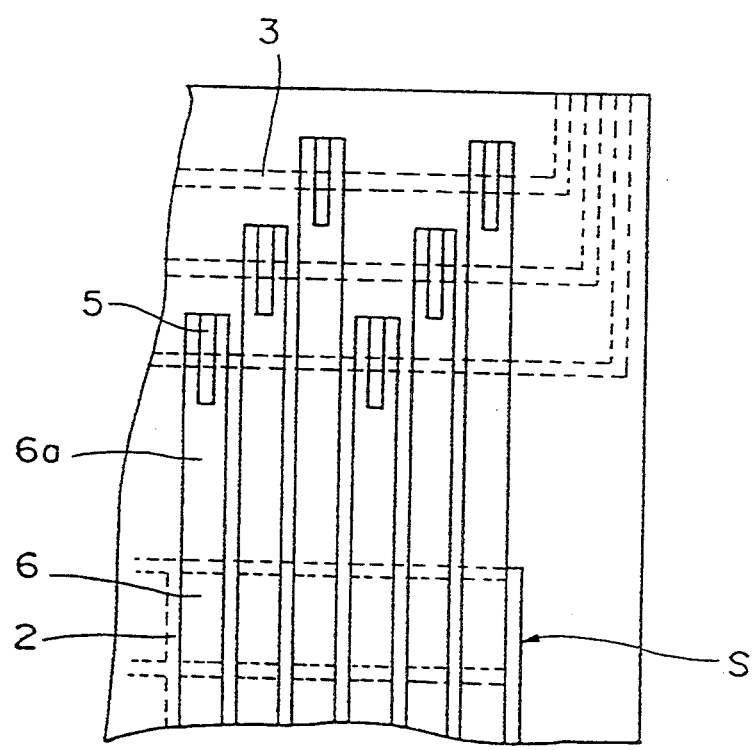
FIG. 8 is a partially cross-sectional view showing a structure of the color filter according to the present invention.

FIG. 7 is a cross-sectional view showing a color filter according to the present invention. FIG. 8 is a partially plan view of the same.

In the color filter according to the second invention, as shown in FIGS. 7 and 8, a black matrix 2 and taking out electrodes 3 are formed on an insulating substrate 1. The black matrix 2 and the taking out electrodes 3 are composed of a light-shielding conductive film such as chromium and nickel.

On the black matrix 2 and the taking out electrodes 3, an insulating film 4 is formed, and a taking out electrode window 5 is formed in the portion of the insulating film 4, said portion corresponding to the taking out electrodes 3.

On the insulating film 4, the transparent electrodes for forming a coloring matter layer are formed. The transparent electrodes 6 for forming a coloring matter layer and the taking out electrodes 3 are electrically connected through the taking out electrode window 5. The electrical contact can be made by filling an electrically conductive material in the taking out electrode window 5.

An insulating protection film 7 is formed on the insulating substrate 1 having the transparent electrodes 6 for forming a coloring matter layer thereon, provided that the insulating protection film 7 is not formed on the portion of the substrate corresponding to the effective display area S. The insulating protection film 7 is formed on the substrate before coloring matter layers are formed.

The electricity passing electrodes 6a located on the portion of the insulating substrate 1 corresponding to the non-effective display area S, are formed and protected by the insulating protection film 7 as shown in FIG. 7. Thus, when coloring matter layers 8 are formed by passing electricity through the electrodes for forming a coloring matter layer, the coloring matter layers are formed on the portion of the electricity passing electrode 6a corresponding to the non-effective display area, resulting in flat surface of the substrate. Further, the color filter 1 and a driving electrode substrate to be bonded thereto can be readily and completely bonded because the bonding portions therefor can be at the same level. This results in improvement of durability.

On the substrate having the above-mentioned coloring matter layer formed thereon, a flattening film and a liquid crystal driving electrode are laminated in this order.

The materials for each element of the color filter according to the second invention and a method of forming each element will be described later.

In addition, the color filter according to the second invention includes a substrate for producing a color filter comprising at least black matrix, a taking out electrode, an insulating film having an electrode taking out window and a coloring matter layer forming electrode on an insulating substrate.

Next, the process for producing a color filter according to the second invention will be described.

The process for producing a color filter according to the second invention is characterized by forming and laminating, in this order, a black matrix, a taking out electrode and an insulating film having a window for a taking out electrode; forming a transparent electrode for forming a coloring matter layer on the insulating layer in such manner that the transparent electrode can be electrically connected to the taking out electrode through the widow for a taking out electrode; and then forming a coloring matter layer by passing electricity to the transparent electrode for forming a coloring matter layer through the taking out electrode.

Figure 9:
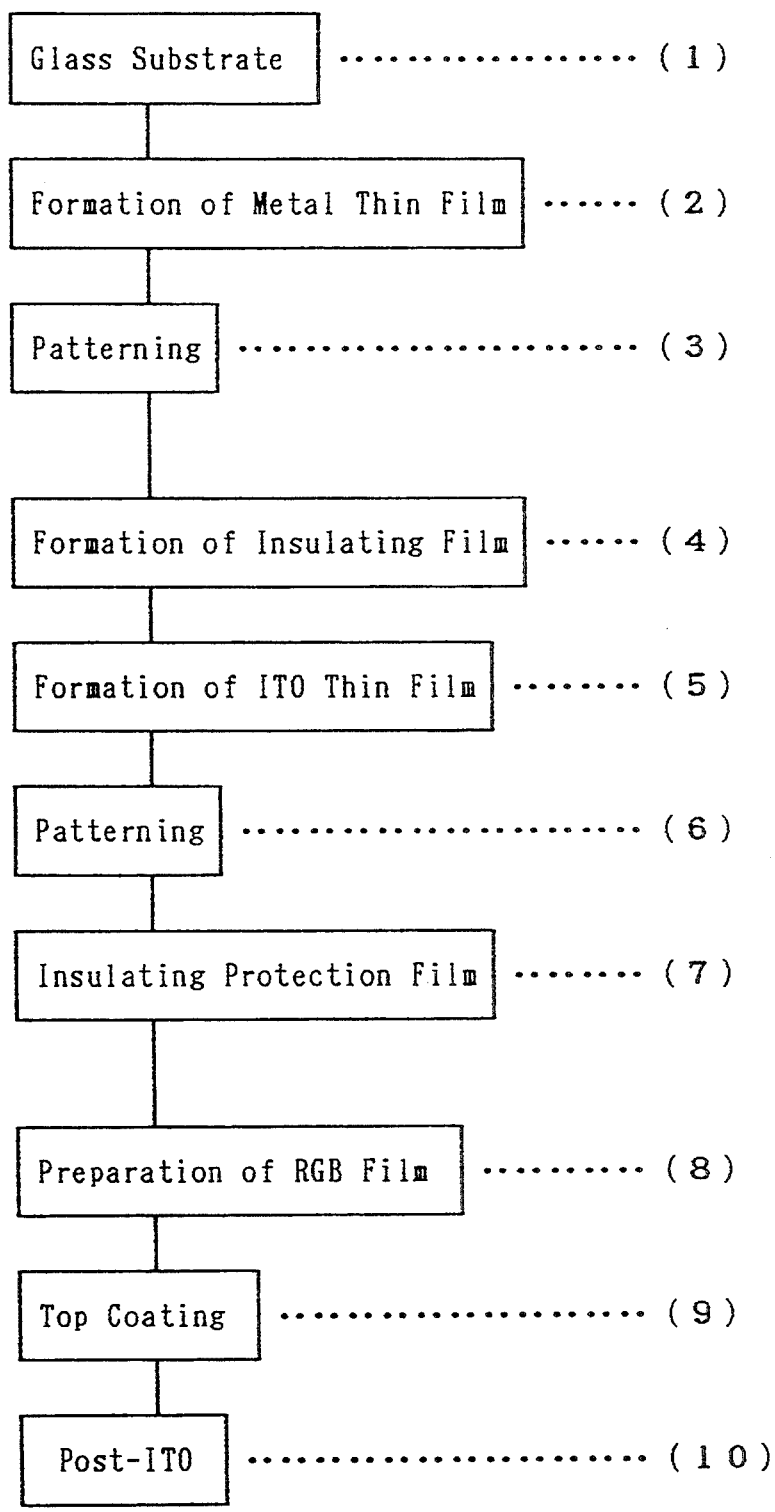
FIG. 9 shows steps of a process for producing the color filter according to one example of the second invention.

FIG. 9 is a flow chart showing the first embodiment of the process for producing a color filter according to the second invention. In addition, a color filter to be produced by this example is the same as that shown in FIG. 7.

(1) A color filter is formed on a glass substrate 1. Glass substrates which can be preferably used include, for example, soda lime glass (blue plate), low expansion glass, non-alkali glass (NA) and quartz glass. Polished glass is preferable, but non-polished ones can be used.

(2) A thin metal film is formed on the above glass substrate 1. The thin metal film is formed on the glass substrate by a sputtering method, vapor deposition method, CVD method or the like, using a metal such as chromium (Cr) and nickel (Ni). The thin metal film should have a light-shielding property and conductivity. In addition, it is preferable to form a $SiO_2$ coating on the glass substrate and then form a thin metal film on the coating in order to improve adhesiveness between the thin metal film and the glass substrate.

Figure 10:
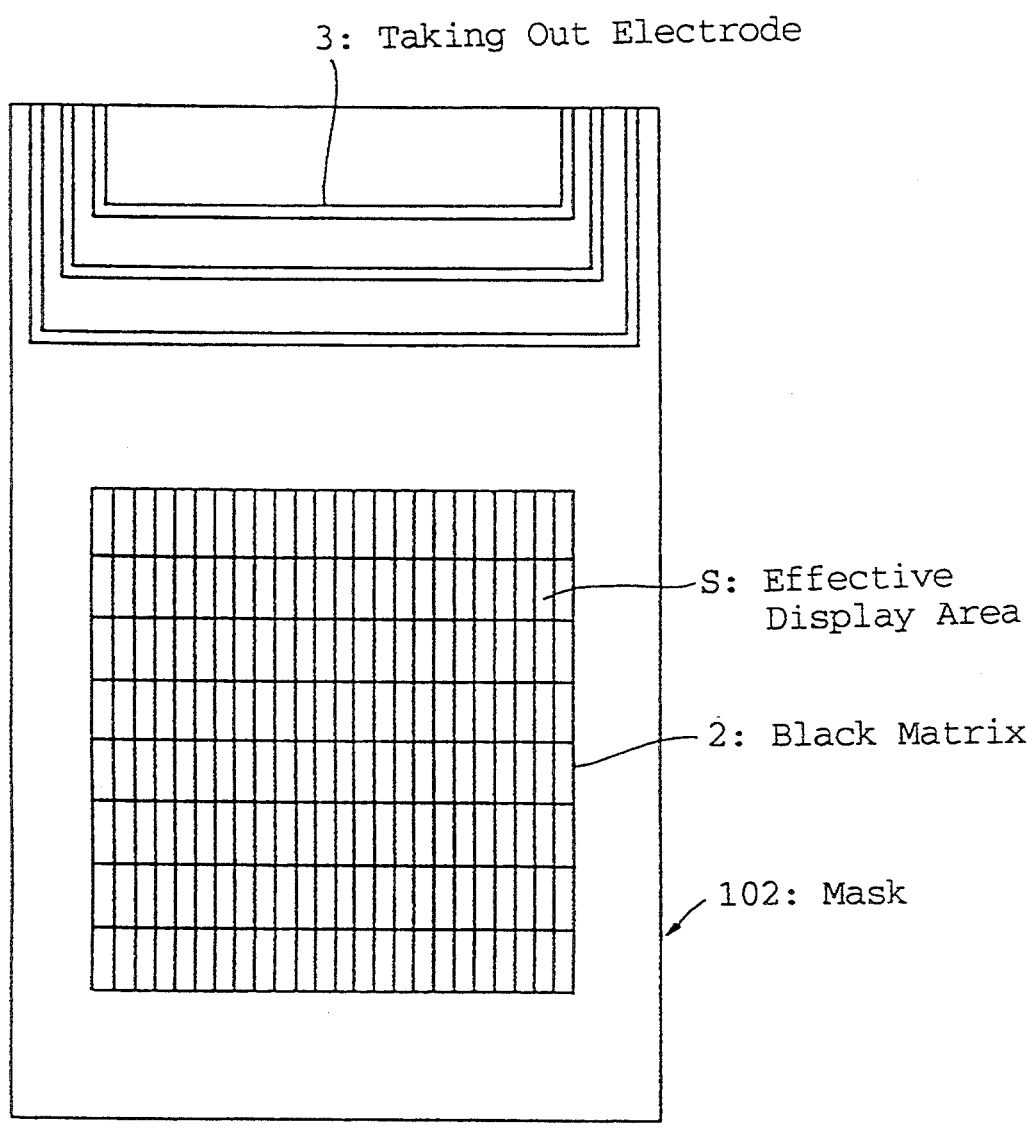
FIGS. 10 and 11 are plan views showing a mask used in the steps as shown in FIG. 9.

(3) Patterning of the thin metal film formed on the glass substrate is carried out by a photo-lithography method, to form a black matrix 2 and a taking out electrode 3 at the same time. The pattering of the thin metal film by a photo-lithography method is carried out in the order of (1) resist application, (2) exposure, (3) development, (4) post-baking, (5) etching of the thin metal film and (6) resist removal. In addition, for the exposure, a mask 102 for forming a black matrix 2 and a taking out electrode 3 as shown in FIG. 10, is used.

(4) An insulating film is formed on the glass substrate on which the black matrix is formed. The insulating film is formed by application of a resist material composed of at least one resin selected from an acrylic resin having sensitivity to ultra-violet ray, an epoxy resin and a siloxane resin, by a spin coater or a roll coater. Then, a taking out electrode window 5 is formed in the insulating film by a photo-lithography method.

Figure 11:
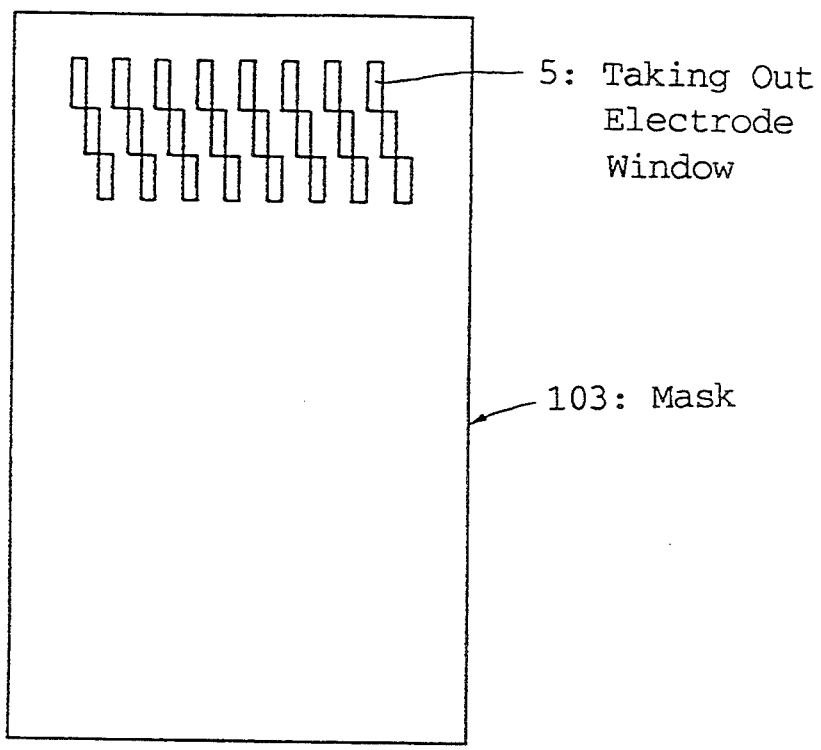

For the formation of the taking out electrode window 5, a designed mask 103 for forming the taking out electrode window as shown in FIG. 11, is used.

Figure 12:
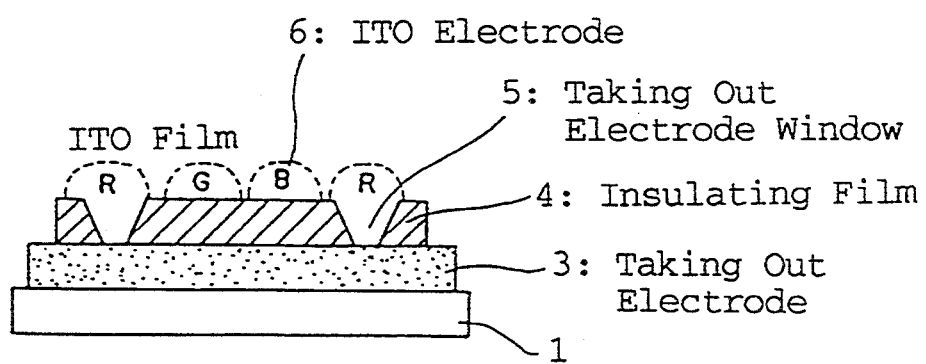
FIG. 12 is a cross-sectional view showing a situation wherein the electrode taking out window is formed in the taper shape.

In addition, when the taking out electrode window 5 is formed by a photo-lithography, it is preferable to form the periphery portion of the taking out electrode window 5 in the taper shape as shown in FIG. 12 by controlling the process conditions such as development time, in order to drastically reduce braking off of lines and pin holes of the ITO to be formed on the taking out electrode window.

(5) An ITO thin film is formed on the insulating film. The ITO film can be formed by way of a sputtering method, a vapor deposition method, a pyro-sol method or the like. When the ITO thin film is formed, the ITO is filled in the taking out electrode window 5 to electrically connect the taking out electrodes 3 and the ITO film.

(6) An ITO electrode 6 is formed by subjecting the above-mentioned ITO thin film to patterning by a photo-lithography method. According to this step, a series of ITO electrodes for each color connected by the taking out electrode 3 are formed. The patterning by a photo-lithography method is the same as that used in the above-mentioned step (3). In addition, the ITO electrode 6 is used as a coloring matter layer forming electrode. The pattern is usually in the shape of stripes.

(7) An insulating protection layer 7 is formed on the portion of the ITO patterning glass substrate with the black matrix which is not corresponding to the effective display area. As used herein, the effective display area means a portion which constitutes a liquid crystal display portion wherein a liquid crystal is encapsulated. A method of forming an insulating protection film 7 in the place where the effective display area is not located (non-effective display area), is not particularly limited. For example, in the case of using a photo-lithography method, the insulating protection film can be formed only in the non-effective display area, by a method comprising applying a positive resist on an ITO patterning glass substrate (all surface) with a spin coater or a roll coater, subjecting the substrate to exposure treatment with a mask 104 having a shielding portion corresponding to effective display area S as shown in FIG. 13, and dissolving and removing the resist coated on the portion corresponding to the effective display portion S by development.

Figure 13:
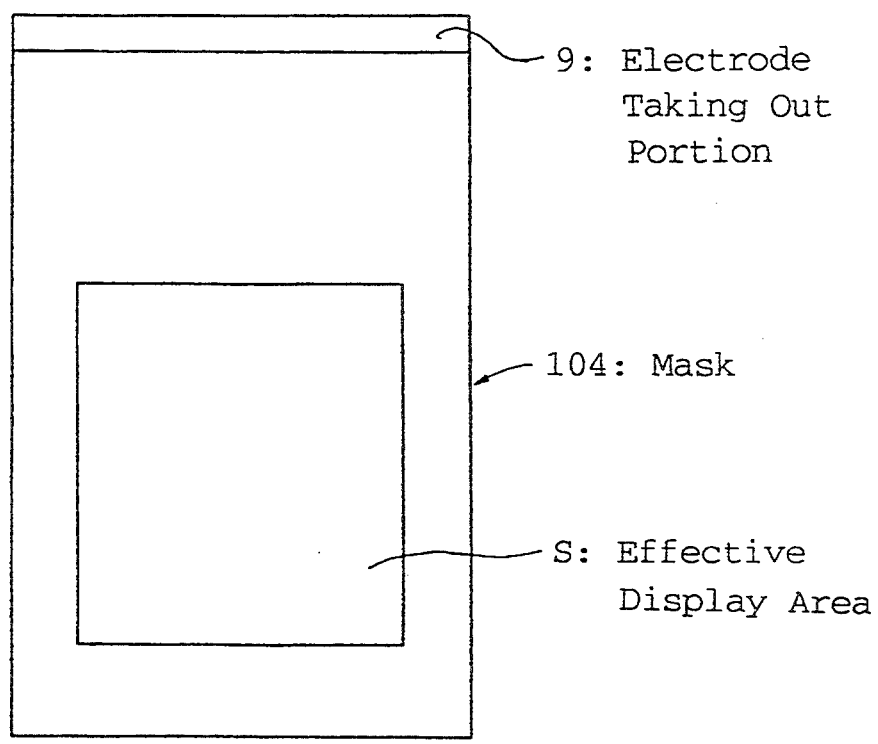
FIG. 13 shows another mask used in the steps as shown in FIG. 9.

In addition, as shown in FIG. 13, if a pattern for forming an electrode taking out portion 9 is additionally made on the mask 104, the electrode taking out portion 9 and the insulating protection film can be simultaneously formed.

In the case of using an offset printing, the insulating protection film is formed by printing a resin oligomer in the non-effective display area, and then polymerizing the oligomer by application of heat.

The materials for the above-mentioned insulating protection film, in the case of using a photo-lithography method, include, a resist material containing at least one resin selected from an acrylic resin having sensitivity to ultra-violet ray, an epoxy resin and a siloxane resin. In the case of forming the insulating protection film by an offset printing, the materials include a thermosetting resin (resin oligomer) comprising as main component at least one resin selected from an acrylic resin having sensitivity to a ultra-violet ray, an epoxy resin and a siloxane resin.

(8) After formation of the above-mentioned insulating protection film, each coloring matter layer (film) 8 for R (red), G (green) or B (blue) is formed. The formation of the coloring matter layer is carried out by a micellar disruption method, an electro-deposition method or the like.

The micellar disruption method comprises immersing a substrate in a micelle solution containing a coloring matter, connecting a potentiostat (outer electrode) to taking out electrodes 3, passing electricity to ITO electrodes (coloring matter layer forming transparent electrodes) 6 to conduct fixed voltage electrolytic treatment, to form the coloring matter layers (films) 8 on the ITO electrodes 6. In this case, the formation of the coloring matter layers is conducted for each color using a micelle solution for each color.

An electro-deposition method comprises dispersing a depositing polymer and a pigment, and forming a coloring matter layer by an electro-deposition coating method with use of the ITO electrode.

(9) After formation of the coloring matter layers, a flattening film (top coating film) is formed on the coloring matter layers. The top coating film is formed by coating a polymer by a spin coating method, and then post-baking the coated polymer.

(10) On the above-mentioned top coating film, a post-ITO electrode is formed. The post-ITO electrode is formed in the same manner as in the above-mentioned steps (5) and (6). In addition, a pattern usually has a stripe pattern which is vertical to the stripe pattern for the ITO electrodes previously formed.

A color filter is produced according to the above-mentioned process.

Next, a color liquid crystal display using the color filter as produced above and its assembling process will be described below.

Figure 14:
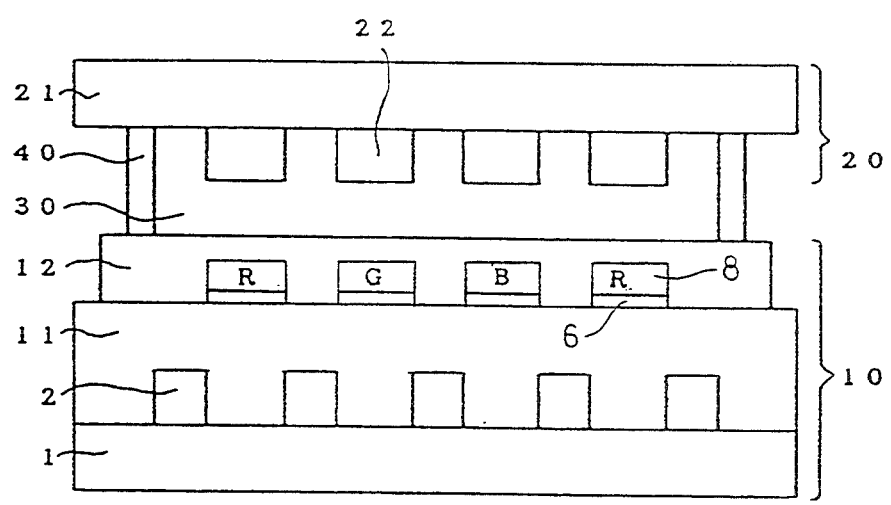
FIG. 14 is a cross-sectional view of a color liquid crystal display.

As shown in FIG. 14, a liquid crystal panel is produced by gluing a color filter substrate 10 and a liquid crystal driving electrode substrate 20 with a spacer 40, and then encapsulating a liquid crystal 30 between them. The color filter 10 is produced by forming coloring matter layers 8 for three primary colors (R, G, B) respectively on a glass substrate 1, forming a black matrix 2 which avoids decrease in contrast and color purity due to leakage of light between the coloring matter layers, applying a top coating material 11 to flatten the surface, and then forming transparent electrodes 12 on the top coating material. The driving substrate 20 is composed of a glass substrate 21 and a driving transparent electrode 22 formed thereon.

Figure 15:
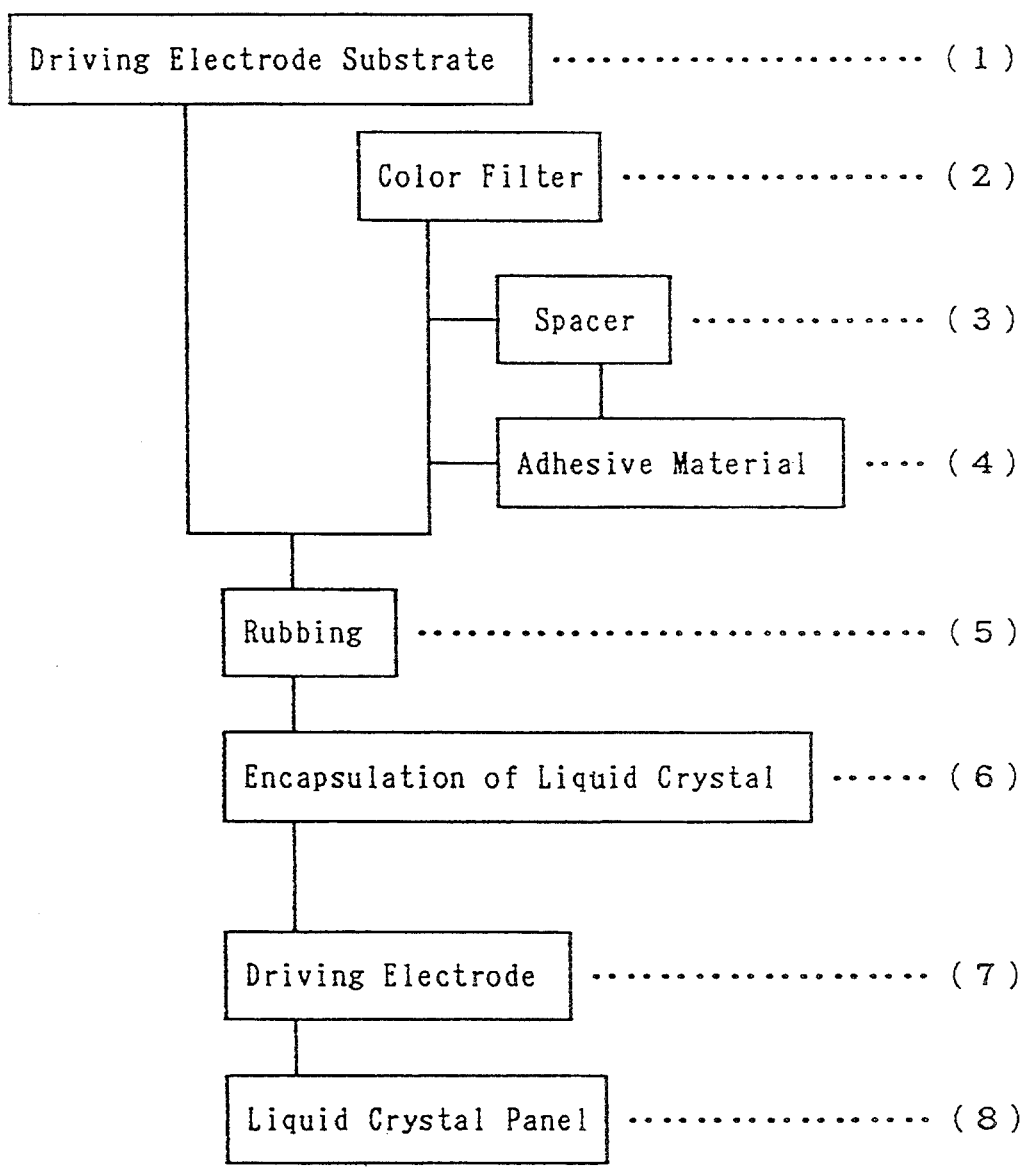
FIG. 15 shows steps of a process for assembling a color liquid crystal display.
Figure 16:
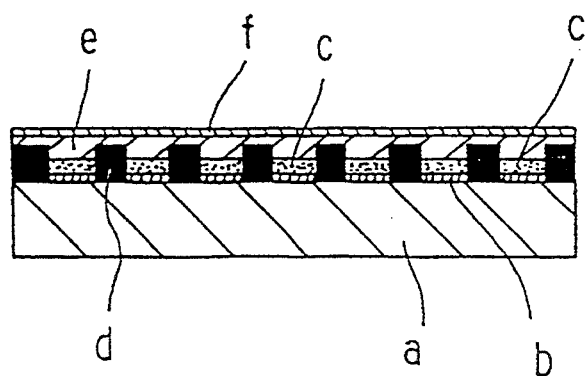
FIG. 16 is a cross-sectional view showing a structure of a conventional color filter.
Figure 17:
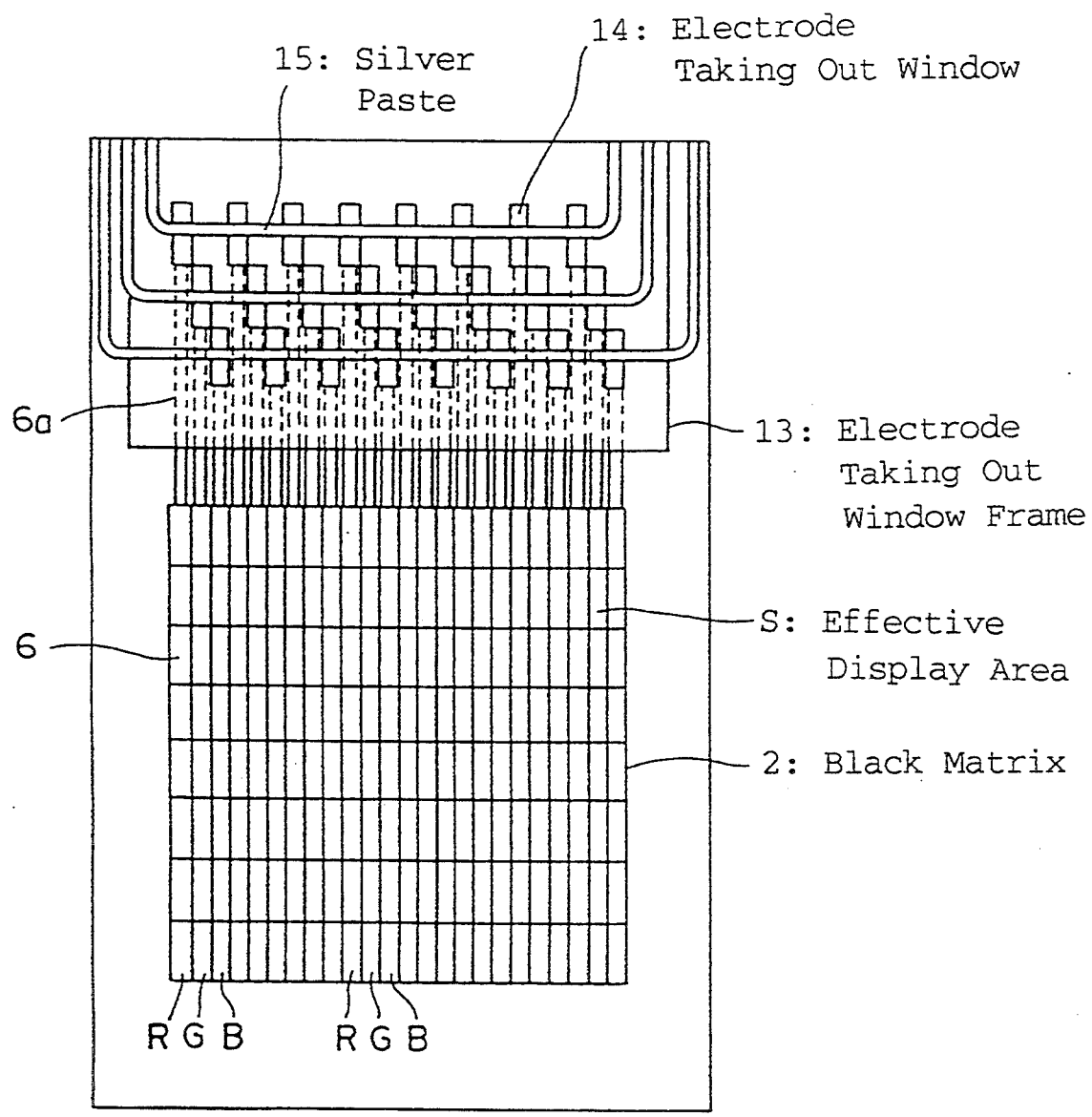
FIG. 17 is a plan view showing a structure of a color filter.
Figure 18:
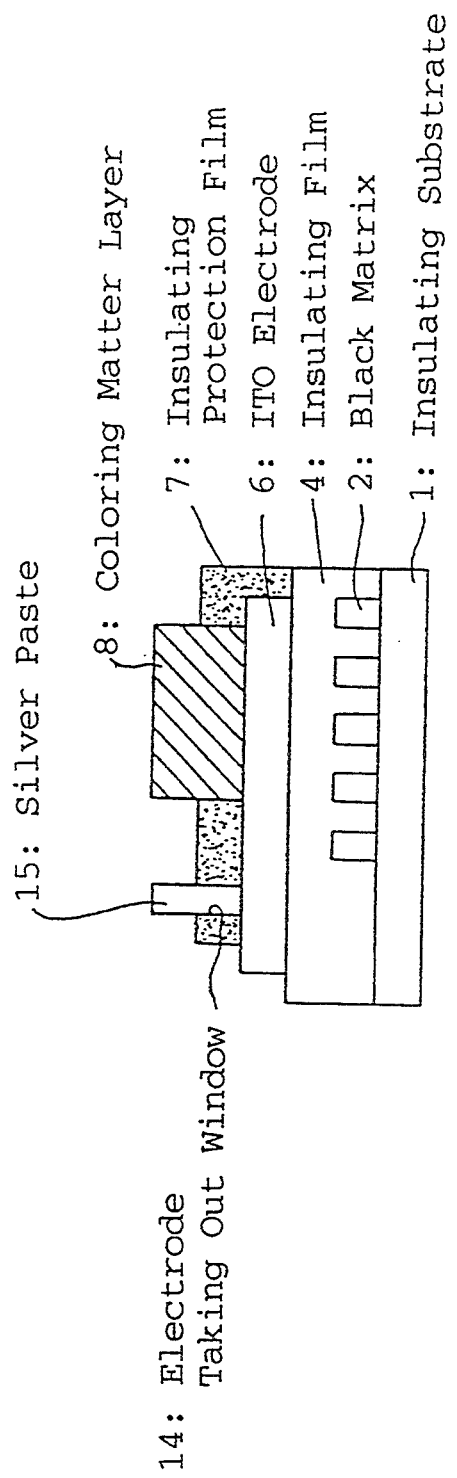
FIG. 18 is a cross-sectional view showing a structure of a color filter.

FIG. 15 shows a process for assembling a color liquid crystal display according to the present invention.

(1) A liquid crystal driving electrode substrate is composed of a glass substrate and a liquid crystal driving transparent electrode formed thereon. In the case of the simple matrix system, belt-shaped transparent electrodes are formed, and a liquid crystal for each picture element is driven by time-sharing from outside. In the case of the active matrix system, for each picture element, a picture element and a matrix array are formed, and a liquid crystal for each picture element is driven by the each matrix array. As non-linear device used as a matrix array, a three terminal type thin film transistor (TFT) and a two terminal type metal-insulator-metal (MIM) are used.

(2) As a color filter, the above-mentioned color filter according to the present invention can be used.

(3) A spacer is used to keep thickness of a liquid crystal layer at a fixed level. The spacer is made of a Teflon film or mica film. In addition, in the case of producing a display panel with wide display area, glass beads, plastic beads or the like are sometimes dispersed in the panel.

(4) As adhesive (encapsulation material), an organic adhesive (such as an epoxy resin based adhesive) and an inorganic adhesive (such as glass solder) can be mentioned. Preferred is an adhesive having good adhesiveness to the insulating protection film formed in the non-effective display area.

(5) Rubbing is made of substrate surface treatment to make uniform molecule arrangement. Depending upon the display system, a parallel orientation treatment or a vertical orientation treatment is used. More specifically, abrasion rubbing, oblique evaporation or the like can be mentioned.

(6) As a method of encapsulating a liquid crystal, a method using surface tension and a method using pressure difference can be mentioned. A vacuum encapsulation method using pressure difference is preferable to avoid forming of bubbles and deterioration.

A liquid crystal to be encapsulated is selected depending upon the display mode. The display mode includes, for example, TN, STN, FLC, AFLC and VAN.

(7) As a method of connecting an electrode and a driver IC, a tip on flexible printed circuit (COF), a tip on glass (COG) or the like can be mentioned.

(8) The color liquid crystal panel (display) according to the present invention is produced by following the above-mentioned procedures. The liquid crystal panel is driven with an alternating current. The liquid crystal panel can be driven by the liquid crystal driving electrode formed on the flattening film of the color filter as mentioned above. However, it is also possible to drive the liquid crystal panel with use of a coloring matter layer forming electrode as a driving electrode, without forming the liquid crystal driving electrode on the flattening film.

The present invention will be described in more detail with reference to the following examples. However, the present invention is not limited to the following examples.

EXAMPLE 1 (First Invention)

A color filter and a color liquid crystal panel were produced in the following manner.

I. Production of Color Filter

Formation of Black Matrix

A thin chromium film having a thickness of about 2,000 Å was laminated, by sputtering, on a soda lime glass substrate (300 mm ×300 mm) which had not been subjected to mirror polishing treatment and silica dipping treatment. As a sputtering equipment (SDP-550VT: manufactured by Alback) was used. The same equipment was used throughout the following Examples.

On this substrate, a UV-curable resist material (IC-28/T3: manufactured by Fuji Hunt Electronics Technology) was coated by spin coating at 1000 rpm. After spin coating, the obtained substrate was pre-baked at 80° C. for 15 minutes. Then, this resist/Cr/glass substrate was set in a stepper exposure equipment. The step-exposure was conducted with a mask prepared by dividing into four pieces a grid pattern having a picture element size of 90 μm ×310 μm, a gap of 20 μm and an effective area of 160 mm ×155 mm. The exposure capacity was 10 mW/cm².S and the scanning speed was 5 mm/sec. Then, the development was conducted by an alkali developing liquid. After development, the obtained substrate was rinsed with pure water, and post-baked at 150° C. Thereafter, the chromium on the substrate was subjected to etching treatment with an aqueous solution of 1M $FeCl_3$/6N HCl/0.1N $HNO_3$/0.1N $Ce(NO_3)_4$ as an etching liquid. The ending point of the etching was measured by electric resistance. The etching took about 20 minutes. After etching, the substrate was rinsed with pure water and the resist was removed with 1N NaOH. The substrate was sufficiently washed with pure water to complete a black matrix.

Formation of Insulating Film and ITO Thin Film

Then, on the above-mentioned black matrix, a silica layer having a thickness of about 1500 Å was formed by sputtering as an insulating film. Further, on the silica layer, an ITO layer having a thickness of about 1300 Å was laminated. At this time, the ITO/$SiO_2$/Cr/glass substrate was heated to 250° C. to adjust the surface resistance of the ITO to 20 Ω/cm².

On the ITO/$SiO_2$/Cr/glass substrate, a UV-curable resist material (IC-28/T3) was coated by spin coating at 1,000 rpm. After spin coating, the substrate was pre-baked at 80° C. for 15 minutes. Thereafter, the resist/ITO/$SiO_2$/Cr/glass substrate was set in a contact exposing equipment (exposure capacity: 10 mW/cm²). A mask used had a stripe pattern having a line width of 90 μm, a gap of 18 μm and a line length of 155 mm. As light source, a 2 kW high pressure mercury lamp was used. After alignment, the substrate was subjected to exposure treatment for 15 seconds with a proximity gas of 50 μm. Then, the development was carried out with an alkali developing liquid. After development, the substrate was rinsed and post-baked at 150° C. Thereafter, the above ITO was subjected to etching treatment with an aqueous solution of 1M $FeCl_3$/1N HCl/0.1N $HNO_3$/0.1N $Ce(NO_3)_4$ as an etching liquid. The ending point of the etching was measured by electric resistance. The etching took about 40 minutes. After etching, the substrate was rinsed with pure water and the resist was removed with 1N NaOH. Further, the substrate was washed with pure water to complete a substrate having a black matrix for forming a coloring matter layer. The completion of the substrate was confirmed by checking that there is no electric leakage among ITO electrodes.

Formation of Coloring Matter Layers

A 10 percent celsolve acetate solution containing an acrylic type resist material (manufactured by Toa Gosei) was used as a resist material for taking out an electrode. The ITO patterning glass substrate with the Cr black matrix prepared was rotated at 10 rpm, and 30 cc of the above-mentioned resist material were sprayed on the substrate. Then, the rotation speed was raised to 1,500 rpm to uniformly form a resist layer on the substrate. The substrate was pre-baked at 80° C. for 15 minutes. Then, the substrate was subjected to exposure treatment using a mask having a designed pattern for taking out electrodes (FIG. 4), while positioning was made by a contact exposing equipment having alignment capability with a 2 kW high pressure mercury lamp. Thereafter, the substrate was developed for 30 seconds with a developing liquid (CD: manufactured by Fuji Hunt Electronics Technology) which had been diluted four times by pure water. Further, the substrate was rinsed with pure water and post-baked at 200° C. for 100 minutes. Then, a silver paste was coated with a dispenser.

To 4L pure water, a ferrocene derivative micelle forming agent, EPEG (manufactured by Dojin Kagaku), LiBr (manufactured by Wako Junyaku) and CHLOMOFUTAL A2B (manufactured by Chiba-Geigy) were added to prepare 2 mM, 0.1M, and 10 gl/l solution, respectively. Each of the obtained solution was stirred by an ultrasonic homogenizer for 30 minutes (micelle solution). The above substrate with the black matrix was immersed in the micelle solution and a potentiostat was connected to R lines of the stripes. The fixed voltage electrolytic treatment at 0.7 V was conducted to obtain a red coloring matter layer. After washing with pure water, the substrate was pre-baked at 180° C. with an oven. The same procedures for formation of the red coloring matter layer were repeated to obtain green and blue coloring matter layers except that 15 g/l of Heliogen Green L9361 (manufactured by BASF) for green, and 9 g/l of Heliogen Blue B7080 (manufactured by BASF) for blue were used. Finally, the silver paste and the resist for taking out electrodes were removed by an alkali solution, and then completely removed with an acetone solution by application of ultrasonic wave.

Formation of Top Coating Layer

Then, 30 cc of a top coating material (JSS7265) were sprayed on the prepared color dividing filter substrate, while the substrate was rotated at 10 rpm. Then, the rotation speed was raised to 1,500 rpm to form a uniform layer. The substrate was post-baked at 220° C. for 100 minutes to form a top coating layer. Thus, an RGB color filter substrate was obtained.

Formation of Post-ITO Layer

On the above top coating layer, an ITO having a thickness of about 1,300 Å was formed by sputtering. At this stage, the color filter substrate was heated to 120°

C., while introducing steam and oxygen, to adjust the surface resistance of the ITO to 20 $\Omega/cm^2$.

Then, on the ITO, a UV-curable resist material (IC-28/T3) was coated by spin coating at 1,000 rpm. After spin coating, the substrate was pre-baked at 80° C. for 15 minutes. Thereafter, the resist/post-ITO/RGB color filter substrate was set in a contact exposing equipment (exposure capacity: 10 mW/cm$^2$). A mask used had a stripe pattern (vertical to the stripe pattern for forming a black matrix) having a line width of 312 $\mu$m, a gap of 18 $\mu$m and a line length of 175 mm. As light source, a 2 kW high pressure mercury lamp was used. After alignment, the substrate was subjected to exposure treatment for 15 seconds with a proximity gas of 50 $\mu$m. Then, the development was carried out with an alkali developing liquid. After development, the substrate was rinsed and post-baked at 180° C. Thereafter, the above ITO on the substrate was subjected to etching treatment with an aqueous solution of 1M $FeCl_3$/1N HCl/0.1N $HNO_3$/0.1N $Ce(NO_3)_4$ as an etching liquid. The ending point of the etching was measured by electric resistance. The etching took about 23 minutes. After etching, the substrate was rinsed with pure water and the resist was removed with 1N NaOH. Thus, the patterning of the ITO was completed to obtain a color filter for STN or MIM.

II. Production of Color Liquid Crystal

On the surface of the color filter prepared, a polyamic acid resin monomer was coated by spin coating. The monomer was cured at 250° C. for 1 hour to obtain a polyimide resin, and then subjected to rubbing treatment. As a counter electrode, a polyamic acid resin monomer was coated by spin coating on the ITO glass substrate with a MIM driving circuit. The monomer was cured at 250° C. for 1 hour to obtain a polyimide resin. After rubbing was made, between this substrate and the above color filter, glass beads and a TN liquid crystal were inserted in this order, and encapsulated by adhesive to complete a panel.

Example 2 (First Invention)

The procedures of Example 1 were repeated to prepare a color filter and a liquid crystal panel, except that a thin nickel film having a thickness of about 1,500 Å was formed by sputtering instead of the thin chromium film.

Example 3 (First Invention)

The procedures of Example 1 were repeated to prepare a color filter and a liquid crystal panel, except that a thin silica film having a thickness of about 1,000 Å was formed by dipping treatment and baking at 250° C. for 1 hour instead of sputtering.

Example 4 (First Invention)

The procedures of Example 1 were repeated to prepare a color filter and a liquid crystal panel, except that a thin alumina film having a thickness of about 1,000 Å was formed by sputtering instead of silica.

Example 5 (First Invention)

The procedures of Example 1 were repeated to prepare a color filter and a liquid crystal panel, except that an insulating under coating was formed using a top coating material (JSR7265: manufactured by Japan Synthetic Rubber) instead of sputtering of silica.

In this case, 30 cc of a top coating material diluted by ethyl celsolve twice were sprayed on the glass substrate at 10 rpm. Then, the rotation speed was raised to 1,500 rpm to form a uniform layer. The substrate was post-baked at 220° C. for 100 minutes to form an under coating layer.

Example 6 (First Invention)

The procedures of Example 1 were repeated to prepare a color filter and a liquid crystal panel, except that an insulating under coating was formed by using a top coating material (OS-808: manufactured by Nagase Industry) instead of sputtering of silica.

In addition, the formation of the under coating layer was conducted in the same manner as in Example 5.

Example 7 (First Invention)

The procedures of Example 1 were repeated to prepare a color filter and a liquid crystal panel, except that a titania film having a thickness of about 2,200 Å was formed by sputtering instead of sputtering of silica.

Example 8 (First Invention)

The procedures of Example 5 were repeated to prepare a color filter for TFT, except that a top coating film was not formed; a post-ITO was directly laminated on the coloring matter layer; and the patterning of the post-ITO was not conducted.

Further, a liquid crystal panel for TFT was produced by combining this color filter with a TFT driving substrate.

Example 9 (First Invention)

The procedures of Example 8 were repeated to prepare a color filter and a liquid crystal panel, except that a non-alkali glass (NA45: manufactured by HOYA: 300 mm ×300 mm) was used instead of soda lime glass as a substrate glass.

Comparative Example 1 (First Invention)

A color filter and a color liquid crystal panel were produced in the following manner.

I. Production of Color Filter

Formation of ITO Electrode

A solution prepared by diluting a UV-curable resist material (IC-28/T3) twice with xylene, was coated by spin coating at 1,000 rpm on a glass substrate having a surface resistance of 20 $\Omega/cm^2$ (NA45: manufactured by HOYA: 300 mm ×300 mm) as an ITO film. After spin coating, the substrate was pre-baked at 80° C. for 15 minutes. Thereafter, the resist/ITO substrate was set in a one-shot exposing equipment (exposure capacity: 10 mW/cm$^2$). A mask used had a stripe pattern having a line width of 100 $\mu$m, a gap of 20 $\mu$m and a line length of 155 mm. As light source, a 2 kW high pressure mercury lamp was used. After alignment, the substrate was subjected to exposure treatment for 15 seconds with a proximity gas of 70 $\mu$m. Then, the development was carried out with an alkali developing liquid. After development, the substrate was rinsed and post-baked at 180° C. Thereafter, the above ITO was subjected to etching treatment with an aqueous solution of 1M $FeCl_3$/1N HCl/0.1N $HNO_3$/0.1N $Ce(NO_3)_4$ as an etching liquid. The ending point of the etching was measured by electric resistance. The etching took about 40 minutes. After etching, the substrate was rinsed with pure water and the resist was removed with 1N NaOH.

Formation of Black Matrix

Then, a mixture containing a resist, CK (manufactured by Fuji Hunt Electronics Technology) and a 10 percent solution of an acrylic type resist (manufactured by Toa Gosei) at a weight ratio of 3:1, was used as a resist material for forming a black matrix. The ITO patterning glass substrate prepared as above was rotated at 10 rpm, and 30 cc of the above-mentioned resist material were sprayed on the substrate. Then, the rotation speed was raised to 2,500 rpm to uniformly form a resist layer on the substrate. The substrate was pre-baked at 80° C. for 15 minutes. Then, the substrate was subjected to exposure treatment using a mask having a designed pattern for taking out electrodes (FIG. 4), while positioning was made by a contact exposing equipment having alignment capability with a 2 kW high pressure mercury lamp. Thereafter, the substrate was developed for 30 seconds with a developing liquid (CD) which had been diluted four times by pure water. Further, the substrate was rinsed with pure water and post-baked at 200° C. for 100 minutes.

Formation of Coloring Matter Layers

To 4L pure water, a ferrocene derivative micelle forming agent, EPEG (manufactured by Dojin Kagaku), LiBr (manufactured by Wako Junyaku) and CHLOMOFUTAL A2B (manufactured by Chiba-Geigy) were added to prepare 2 mM, 0.1M, and 10 g/l solution, respectively. Each of the obtained solution was stirred by a ultrasonic homogenizer for 30 minutes (micelle solution). The above substrate with the black matrix was immersed in the micelle solution and a potentiostat was connected to R lines of the stripes. The fixed voltage electrolytic treatment at 0.5 V was conducted to obtain a red coloring matter layer. After washing with pure water, the substrate was pre-baked at 180° C. with an oven. The same procedures for formation of the red coloring matter layer were repeated to obtain green and blue coloring matter layers except that 15 g/l of Heliogen Green L9361 (manufactured by BASF) for green, and 9 g/l of Heliogen Blue K7080 (manufactured by BASF) for blue were used. Thus, coloring matter layers for RGB were obtained.

Formation of Top Coating Layer

Then, 30 cc of a top coating material (JSS7265) were sprayed on the prepared color dividing filter substrate, while the substrate was rotated at 10 rpm. Then, the rotation speed was raised to 1,500 rpm to form a uniform layer. The substrate was post-baked at 220° C. for 100 minutes to form a top coating layer. Thus, an RGB color filter substrate was obtained.

Formation of Post-ITO Layer

On the above top coating layer, an ITO having a thickness of about 1,300 Å was formed by sputtering. At this stage, the color filter substrate was heated to 120° C., while introducing steam and oxygen, to adjust the surface resistance of the ITO to 20 $\Omega/cm^2$.

Next, the physical properties of the color filters obtained in the above Examples 1 to 8 and Comparative Example 1 were measured as follows.

Measurement Method

The transmittance of the color filter was measured with a spectrophotometer (MCPD-1100: manufactured by Ohtsuka Electronics) using tramsmittance of a glass substrate as standard. The standard value for the transmittance was set 450 nm for red, 545 nm for green and 610 nm for blue. The black matrix was evaluated with a spectrophotometer (MCPD-1100: manufactured by Ohtsuka Electronics) using absorbance. As absorbance, the minimum value of the absorbance for each wave length (450 nm to 650 nm) was used as the absorption degree of the black matrix (BMOD). As the absorbance increases, the light shielding rate increases. The high absorbance means better performance of the black matrix.

Further, from the view point of the contrast of the coloring matter thin film, the sharpness of the boundary portion between the black matrix (BM) and the coloring matter layers was evaluated. Using the Polaloid photography from an optical microscope (magnitude: 200 times), in the boundary between the BM and the coloring matter layers, the distance between the boundary portion and a point when the optical concentration becomes the same as the bulk of the BM or the coloring matter film, was measured. As the distance becomes shorter, the sharpness becomes higher. The uniformity of the thin coloring matter layer was measured from a picture taken by an electron-microscope. From a picture of the cross-sectional structure with magnitude of 3,000 times, the maximum value of the surface roughness was measured. Then, the surface roughness was standardized by average film thickness. The deficiencies of the color filter were indicated by a number of bad picture elements out of all picture elements.

Further, a taking out electrode having a driver IC in a FPC was connected to each color liquid crystal panel, and then the contrast was measured by operating a driving circuit as shown in the following Table 1. Further, the surface resistance was measured in this situation. Finally, the pencil hardness of the each thin coloring matter film and the adhesiveness between the glass substrate and the each color filter, were measured.

The adhesiveness was measured by applying celotape (LP-18: manufactured by Nichiban), making parallel scratched lines with a gap of 1 mm on the celotape surface, removing the celotape using a snap, and then observing the appearance of the surface. The results are as shown in Table 1.

TABLE 1

| Example | Color Filter Driving Circuit | Transmittance (%) R | G | B | BM OD (abs) | Boundary Sharpness (μm) | Film Uniform Flatness (%) | Surface Resistance ($\Omega/cm^2$) | Contrast | Thin Film Hardness | Adhesiveness |
|---|---|---|---|---|---|---|---|---|---|---|---|
| 1 | MIM | 65 | 62 | 58 | 4.5 | 0.1 | 8 | 15 | 46 | 4H | ○ |
| 2 | MIM | 65 | 65 | 56 | 3.5 | 0.2 | 5 | 14 | 23 | 4H | ○ |
| 3 | MIM | 65 | 60 | 55 | 4.5 | 0.1 | 9 | 14 | 45 | 4H | ○ |
| 4 | MIM | 61 | 58 | 52 | 4.5 | 0.3 | 9 | 14 | 38 | 4H | ○ |

TABLE 1-continued

| Example | Color Filter Driving Circuit | Transmittance (%) | | | BM OD (abs) | Boundary Sharpness (μm) | Film Uniform Flatness (%) | Surface Resistance (Ω/cm²) | Contrast | Thin Film Hardness | Adhesiveness |
|---|---|---|---|---|---|---|---|---|---|---|---|
| | | R | G | B | | | | | | | |
| 5 | MIM | 65 | 61 | 54 | 4.4 | 0.1 | 8 | 15 | 40 | 4H | ◉ |
| 6 | MIM | 65 | 61 | 55 | 4.5 | 0.1 | 9 | 15 | 45 | 4H | ◉ |
| 7 | MIM | 65 | 61 | 55 | 4.5 | 0.1 | 9 | 15 | 45 | 4H | ○ |
| 8 | TFT | 65 | 61 | 55 | 4.5 | 0.1 | 13 | 15 | 85 | 6H | ◉ |
| 9 | TFT | 68 | 65 | 68 | 4.2 | 0.1 | 11 | 15 | 95 | 5H | ○ |
| Comp. Example | TFT | 65 | 61 | 58 | 2.5 | 0.8 | 18 | 15 | 40 | 4H | ○ |

◉: No Delamination Found
○: A Little Delamination Found

Next, the second invention will be described in more detail with reference to the following examples.

Example 10 (Second Invention)

A color filter and a color liquid crystal panel were produced in the following manner.

Formation of Cr Black Matrix

On a soda lime glass substrate which had been subjected to mirror polishing treatment (300 mm ×300 mm), silica (SiO₂; manufactured by Tokyo Ouka: OCD-TYPE-7) was coated by sputtering at 1,000 rpm. After baking at 350° C. for 60 minutes, the substrate was cooled to room temperature. Then, a chromium thin film having a thickness of about 2,000 Å was coated by sputtering on the glass substrate coated with silica. As a sputtering equipment(SDP-550VT: manufactured by Alback) was used.

On this substrate, a UV-curable resist material (IC-28/T3: manufactured by Fuji Hunt Electronics Technology) was coated by spin coating at 1000 rpm. After spin coating, the obtained substrate was pre-baked at 80° C. for 15 minutes. Then, this resist/Cr/glass substrate was set in a stepper exposure equipment (exposure capacity: 10 mW/cm².S). The step-exposure was conducted with a mask, as shown in FIG. 10, prepared by dividing into four pieces a grid pattern and a designed mask for forming taking out electrodes, which have a picture element size of 90 μm ×310 μm, a gap of 20 μm and an effective area of 160 mm × 155 mm. The scanning speed was 5 mm/sec. Then, the development was conducted by an alkali developing liquid. After development, the obtained substrate was rinsed with pure water, and post-baked at 150° C. Thereafter, the chromium on the substrate was subjected to etching treatment with an aqueous solution of 6N HCl/0.1N HNO₃/0.1N Ce(NO₃)₄ as a etching liquid. The ending point of the etching was measured by electric resistance. The etching took about 20 minutes. After etching, the substrate was rinsed with pure water and the resist was removed with 1N NaOH. The substrate was sufficiently washed with pure water to complete a chromium black matrix and a taking out electrode at the same time.

Formation of Insulating Film and ITO Thin Film

Then, on the above-mentioned chromium black matrix (CrBM), an insulating resist (CT: manufactured by Fuji Hunt Electronics Technology) was coated by spin coating at 1,000 rpm. The substrate was baked at 80° C. for 15 minutes, and then cooled to room temperature to form an insulating film.

Then, this resist/Cr/glass substrate was set in a stepper exposure equipment. A mask used was prepared by dividing into four pieces a pattern having a picture element size of 90 μm ×30 μm (for electrode taking out window), and an effective area of 300 mm ×300 mm. The exposure capacity was 10 mW/cm².S and the scanning speed was 5 mm/sec. Then, the development was conducted by an alkali developing liquid. The development was conducted for 60 seconds (five times shorter than usual (300 seconds)). As shown in FIG. 12, it was confirmed that the pattern was formed in the taper shape. After development, the obtained substrate was rinsed with pure water, and post-baked at 150° C. for 60 minutes. Then, the substrate was cooled to room temperature to form an insulating film having a taking out electrode window.

Then, on this substrate, an ITO layer having a thickness of about 1300 Å was coated by sputtering with a sputtering equipment (SDP-550VT: manufactured by Alback). At this stage, the work was heated to 200° C. to adjust the surface resistance of the ITO film to 20 Ω/cm².

On the ITO thin film/insulating film/CrBM/glass substrate, a UV-curable resist material (IC-28/T3: manufactured by Fuji Hunt Electronic Technology) was coated by spin coating at 1,000 rpm. After spin coating, the substrate was pre-baked at 80° C. for 15 minutes. Thereafter, the resist/ITO thin film/insulating film/CrBM/glass substrate was set in a contact exposing equipment (exposure capacity: 10 mW/cm².S). A mask used had a stripe pattern having a line width of 92 μm, a gap of 18 μm and a line length of 155 mm. As light source, a 2 kW high pressure mercury lamp was used.

After alignment, the substrate was subjected to exposure treatment for 15 seconds with a proximity gas of 50 μm. Then, the development was carried out with an alkali developing liquid. After development, the substrate was rinsed and post-baked at 150° C. Thereafter, the above ITO was subjected to etching treatment with an aqueous solution of 1M FeCl₃/1N HCl/0.1N HNO₃/0.1N Ce(NO₃)₄ as an etching liquid, to prepare an ITO electrode. The ending point of the etching was measured by electric resistance. The etching took about 40 minutes. After etching, the substrate was rinsed with pure water and the resist was removed with 1N NaOH. Further, the substrate was washed with pure water to complete a substrate having ITO electrodes (coloring matter layer forming electrodes). The completion of the substrate was confirmed by checking that there is no electric leakage among ITO electrodes.

Formation of Insulating Protection Film In Non-Effective Display Area

An acrylic type resist material (manufactured by Fuji Hunt Electronics Technology) was used as a resist material for forming a taking out electrode and an insulating protection film for non-effective display area. The ITO patterning glass substrate with the Cr black matrix prepared was rotated at 10 rpm, and 30 cc of the above-mentioned resist material were sprayed on the substrate. Then, the rotation speed was raised to 1,500 rpm to uniformly form a resist layer on the substrate. The substrate was pre-baked at 80° C. for 15 minutes. Then, the substrate was subjected to exposure treatment using a mask having a designed pattern for forming electrode taking out portion 9 and an insulating protection film for the non-effective display area S (as shown in FIG. 13), while positioning was made by a contact exposing equipment having alignment capability with a 2 kW high pressure mercury lamp. Thereafter, the substrate was developed for 90 seconds with a developing liquid to remove the resist material on the electrode taking out portion 9 and the effective display portion S. Further, the substrate was rinsed with pure water and post-baked at 180° C. for 100 minutes.

According to the above procedures, an insulating protection film was formed on the substrate for non effective display area and also the electrode taking out portion 9 was formed at the same time.

Formation of Coloring Matter Layers for Three Primary Colors

To 4L pure water, a ferrocene derivative micelle forming agent, EPEG (manufactured by Dojin Kagaku), LiBr (manufactured by Wako Junyaku) and CHLOMOFUTAL A2B (manufactured by Chiba-Geigy) were added to prepare 2 mM, 0.1M, and 10 gl/l solution, respectively. Each of the obtained solution was stirred by a ultrasonic homogenizer for 30 minutes to prepare a micelle solution. The above color filter substrate with the ITO electrode was immersed in the micelle solution and a potentiostat was connected to R lines of the stripes. The fixed voltage electrolytic treatment at 0.5 V was conducted to obtain a red coloring matter layer. After washing with pure water, the substrate was pre-baked at 180° C. with an oven. The same procedures for formation of the red coloring matter layer were repeated to obtain green and blue coloring matter layers except that 15 g/l of Heliogen Green L9361 (manufactured by BASF) for green, and 9 g/l of Heliogen Blue K7080 (manufactured by BASF) for blue were used. Thus, RGB coloring matter layers were obtained.

In addition, it was confirmed that no leakage and braking off of lines were found at the time of the electricity passing treatment, and the coloring matter layer forming electrode (ITO electrode) and the taking out electrode were connected without pin holes.

Formation of Top Coating Layer

Then, 30 cc of a top coating material (OS-808: manufactured by Nagase) were sprayed on the prepared color dividing filter substrate, while the substrate was rotated at 10 rpm. Then, the rotation speed was raised to 15,000 rpm to form a uniform layer. The substrate was post-baked at 260° C. for 100 minutes to form a top coating layer. Thus, a top coating film (flattening film) was formed on the coloring matter layer for RGB three primary colors.

Formation of Liquid Crystal Driving Electrode (Post-ITO Electrode)

On the above top coating film, an ITO film having a thickness of about 1,300 Å was formed by sputtering with a sputtering equipment (SDP-550VT: manufactured by Alback). At this stage, the color filter substrate was heated to 120° C., while introducing steam and oxygen, to adjust the surface resistance of the ITO film to 20 $\Omega/cm^2$.

Then, on the ITO film formed substrate, a UV-curable resist material (IC-28/T3: manufactured by Fuji Hunt Electronics Technology) was coated by spin coating at 1,000 rpm. After spin coating, the substrate was pre-baked at 80° C. for 15 minutes. Thereafter, the substrate was set in a contact exposing equipment (exposure capacity: 10 $mW/cm^2.S$). A mask used had a stripe pattern (vertical to the stripe pattern for forming a black matrix) having a line width of 312 $\mu m$, a gap of 18 $\mu m$ and a line length of 175 mm. As light source, a 2 kW high pressure mercury lamp was used. After alignment, the substrate was subjected to exposure treatment for 15 seconds with a proximity gas of 50 $\mu m$. Then, the development was carried out with an alkali developing liquid. After development, the substrate was rinsed with pure water and post-baked at 180° C. Thereafter, the above ITO film on the substrate was subjected to etching treatment with an aqueous solution of 1M $FeCl_3$/1N HCl/0.1N $HNO_3$/0.1N $Ce(NO_3)_4$ as an etching liquid. The ending point of the etching was measured by electric resistance. The etching took about 23 minutes. After etching, the substrate was rinsed with pure water and the resist was removed with 1N NaOH. Thus, the patterning of the ITO was completed to obtain a color filter for STN or MIM.

Production of Color Liquid Crystal Display (Panel)

On the surface of the color filter substrate prepared as above, a polyamic acid resin monomer was coated by spin coating. The monomer was cured at 250° C. for 1 hour to obtain a polyimide resin, and then subjected to rubbing treatment. As counter electrode, a polyamic acid resin monomer was coated by spin coating on the ITO glass substrate with a MIM driving circuit. The monomer was cured at 250° C. for 1 hour to obtain a polyimide resin. After rubbing was made, between (liquid crystal) the above color filter substrate and the glass substrate with a MIM driving circuit, glass beads and a TN liquid crystal were inserted in this order, and encapsulated by adhesive to complete a color liquid crystal display (panel).

To the color liquid crystal panel, a taking out electrode having a driving IC on the FPC was connected, and polarization plates were bonded to the both side. The operation of the liquid crystal was confirmed by driving the obtained MIM driving circuit.

INDUSTRIAL APPLICABILITY

The above-mentioned color filter or color liquid crystal display according to the present invention, can be preferably used as a color liquid crystal display for a personal computer, a lap-top personal computer, a note-type personal computer, a word processor, a wall hanging TV, a liquid crystal TV or the like; a color filter for an aurora vision, CCD or the like; or a color display for an audio equipment, an interior panel for automotive, a watch, a clock, a calculator, a video deck, a facsimile, a communication equipment, a game machine, a measurement equipment or the like.

We claim:

1. A color filter comprising a metal black matrix, an insulating film, a transparent electrodes, a coloring matter layer and a post-ITO layer above the coloring matter layer, laminated in this order, on one side of an insulating substrate, said post-ITO layer being subjected to patterning.

2. A color filter according to claim 1, wherein the metal black matrix is composed of chromium or nickel.

3. A color filter according to claim 1, wherein the insulating film is composed of silica, titania or alumina.

4. A color filter according to claim 1, wherein the insulating film is composed of an insulating polymer.

5. A color liquid crystal display comprising, the color filter set forth in claim 1, an electrode substrate for driving a liquid crystal and the liquid crystal encapsulated between them so that the transparent electrode for forming the coloring matter layer is used as an electrode for driving the liquid crystal.

6. A color filter according to claim 1, further comprising a top coating layer between the coloring matter layer and the post-ITO layer.

7. A color filter prepared by laminating, in this order, a black matrix and a taking out electrode, an insulating film having a window for said taking out electrode, a transparent electrode for forming a coloring matter layer, an insulating protection layer, said coloring matter layer, a flattening film and an electrode for driving a liquid crystal on an insulating substrate, wherein said taking out electrode and said transparent electrode for forming a coloring matter layer are electrically connected through said window for said taking out electrode.

8. A color filter according to claim 2, wherein the black matrix and the taking out electrode are simultaneously formed on the insulating substrate with use of a light-shielding film.

9. A color filter according to claim 7, wherein the insulating film is made of a resist material composed of at least one resin selected from an acrylic resin having sensitivity to a ultra-violet ray, an epoxy resin and a siloxane resin.

10. A process for producing a color filter comprising forming and laminating, in this order, a black matrix and a taking out electrode, an insulating film having a window for said taking out electrode; forming a transparent electrode for forming a coloring matter layer on the insulating layer in such manner that the transparent electrode can be electrically connected to the taking out electrode through the window for said taking out electrode; and then forming said coloring matter layer by passing electricity to the transparent electrode for forming the coloring matter layer through the taking out electrode.

11. A process for producing a color filter according to claim 10, wherein a film of said transparent electrode material is formed on an entire surface of the insulating layer to make electrical contact between the taking out electrode and the film made of the transparent electrode material, and then the film made of the transparent electrode material is subjected to patterning by a photolithography method to form the transparent electrode for forming the coloring matter layer.

12. A process for producing a color filter according to claim 10, wherein an insulating protection film is formed on the portion of the substrate for non-effective display area, said substrate having the transparent electrode for forming said coloring matter layer, and then said coloring matter layer is formed by passing electricity.

13. A process for producing a color filter according to claim 10, wherein development time for the photolithography treatment is controlled to form a periphery portion of the taking out electrode window of the insulating film in a tapered shape.

14. A process for producing a color filter according to claim 10, wherein the insulating film is made of a resist material composed of at least one resin selected from an acrylic resin having sensitivity to a ultra-violet ray, an epoxy resin and a siloxane resin.

15. A process for producing a color filter according to claim 10, wherein said coloring matter layer is formed by passing electricity to the taking out electrode which is electrically connected to the transparent electrode, by way of a micellar disruption method or an electro-deposition method.

* * * * *